US008831636B2

(12) United States Patent
Kim et al.

(10) Patent No.: US 8,831,636 B2
(45) Date of Patent: Sep. 9, 2014

(54) METHOD OF OPERATING MOBILE DEVICE BY RECOGNIZING USER'S GESTURE AND MOBILE DEVICE USING THE METHOD

(75) Inventors: Young-suk Kim, Gyeonggi-do (KR); Kyung-eun Lee, Gyeonggi-do (KR); Jun-ho Koh, Gyeonggi-do (KR); Hae-sik Jun, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 13/225,944

(22) Filed: Sep. 6, 2011

(65) Prior Publication Data

US 2012/0058783 A1 Mar. 8, 2012

(30) Foreign Application Priority Data

Sep. 6, 2010 (KR) .................. 10-2010-0087038

(51) Int. Cl.
*H04W 24/00* (2009.01)
(52) U.S. Cl.
USPC .............. 455/456.2; 455/456.1; 455/509; 455/418; 455/135; 455/437; 455/412.2; 370/331; 370/332; 370/252
(58) Field of Classification Search
CPC ........ H04W 4/02; H04W 64/00; H04L 67/18; H04M 1/72572; G01S 5/0252
USPC .......... 345/467, 168, 173; 715/823, 810, 858; 455/466, 566, 99, 73, 412.2, 456.1, 455/456.2, 509, 574, 437, 418, 414.1, 517, 455/41.2, 556.1, 550.1, 411; 370/349, 252, 370/332, 335, 342, 338, 331
See application file for complete search history.

(56) References Cited

U.S. PATENT DOCUMENTS

| 2005/0032510 | A1 | 2/2005 | Ryu et al. | |
|---|---|---|---|---|
| 2005/0210417 | A1 | 9/2005 | Marvit et al. | |
| 2005/0212751 | A1 | 9/2005 | Marvit et al. | |
| 2005/0286466 | A1* | 12/2005 | Tagg et al. | 370/329 |
| 2006/0015812 | A1* | 1/2006 | Cunningham et al. | 715/535 |
| 2006/0221051 | A1 | 10/2006 | Flynt et al. | |
| 2007/0064647 | A1* | 3/2007 | Prasad | 370/331 |
| 2008/0174547 | A1 | 7/2008 | Kanevsky et al. | |
| 2009/0319181 | A1 | 12/2009 | Khosravy et al. | |
| 2010/0145695 | A1* | 6/2010 | Jung et al. | 704/246 |
| 2010/0188328 | A1 | 7/2010 | Dodge et al. | |
| 2010/0199230 | A1 | 8/2010 | Latta et al. | |
| 2010/0208038 | A1 | 8/2010 | Kutliroff et al. | |
| 2011/0007142 | A1* | 1/2011 | Perez et al. | 348/77 |
| 2011/0131041 | A1* | 6/2011 | Cortez et al. | 704/235 |
| 2011/0320978 | A1* | 12/2011 | Horodezky et al. | 715/823 |
| 2012/0038652 | A1* | 2/2012 | Yang | 345/467 |
| 2012/0056814 | A1* | 3/2012 | Sudo | 345/168 |

FOREIGN PATENT DOCUMENTS

| JP | 2004312439 | 11/2004 |
|---|---|---|
| JP | 2005-192206 | 7/2005 |
| JP | 2006-285966 | 10/2006 |

\* cited by examiner

*Primary Examiner* — Joseph Arevalo
(74) *Attorney, Agent, or Firm* — The Farrell Law Firm, P.C.

(57) ABSTRACT

A method of operating a mobile device by recognizing a user's gesture and a mobile device that uses the method, the method includes recognizing the user's gesture and circumstance information; generating circumstantial gesture information according to a combination of the recognized gesture and the circumstance information; and executing an application item corresponding to the circumstantial gesture information.

16 Claims, 14 Drawing Sheets

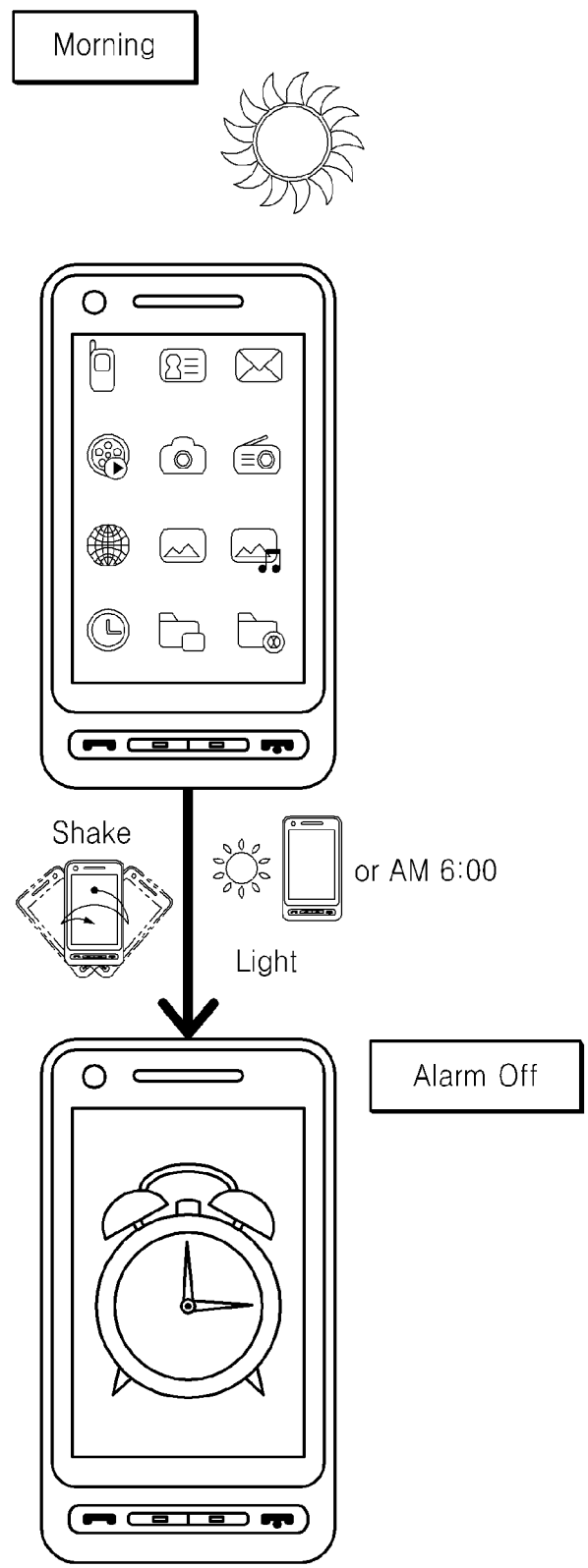

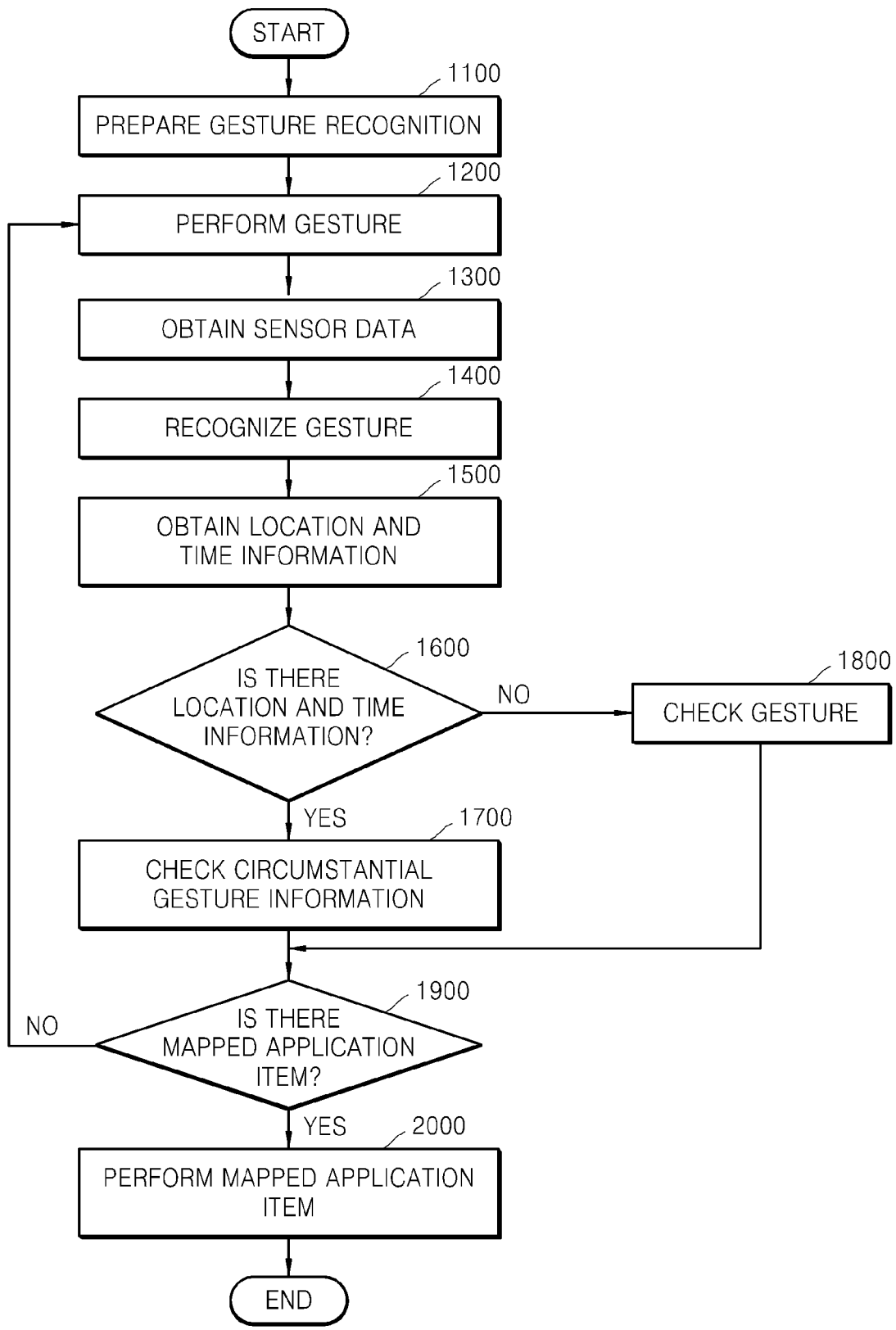

METHOD OF OPERATING MOBILE DEVICE BY RECOGNIZING USER'S GESTURE AND MOBILE DEVICE USING THE METHOD

PRIORITY

This application claims priority under 35 U.S.C. §119(a) to Korean Patent Application No. 10-2010-0087038, filed on Sep. 6, 2010, in the Korean Intellectual Property Office, the entire content of which is incorporated herein by reference.

BACKGROUND OF THE INVENTION

1. Field of the Invention

The present invention relates generally to a method of operating a mobile device by recognizing a user gesture and a mobile device using the method, and, more particularly, to a method of operating a mobile device by recognizing a user gesture and a mobile device using the method.

2. Description of the Related Art

As various mobile devices, such as smartphones, for example, become increasingly popular, various services, such as a gesture recognition service, have been provided to users through mobile devices. When performing a gesture previously defined in a mobile device, an application in the mobile device may perform a particular action (i.e., an "application item") according to the gesture.

According to current methods, various application items may be performed based on various gestures. However, according to these methods, a specific gesture is not further processed in consideration of information corresponding to various surrounding circumstances, such as a specific location or time when the gesture is sensed by the mobile terminal.

SUMMARY OF THE INVENTION

Embodiments of the present invention are provided to address the above-described problems and/or provide the following advantages. An aspect of the present invention provides a method of operating a mobile device by recognizing a user's gesture.

Another aspect of the present invention provides a mobile device that operates based on the method.

Further another aspect of the present invention provides a computer-readable recording medium having recorded thereon a program for executing the method.

According to an aspect of the present invention, a method of operating a mobile device by recognizing a user's gesture is provided. The method includes recognizing the user's gesture and circumstance information; generating circumstantial gesture information according to a combination of the recognized gesture and the circumstance information; and executing an application item corresponding to the circumstantial gesture information.

According to another aspect of the present invention, a method of operating a mobile device by recognizing a user's gesture is provided. The method includes recognizing the user's gesture and circumstance information; generating circumstantial gesture information according to a combination of the recognized gesture and the circumstance information; mapping the circumstantial gesture information to one of a plurality of application items; and storing the mapping of the circumstantial gesture information to the one application item.

According to another aspect of the present invention, a mobile device operating by recognizing a user's gesture is provided. The mobile device includes a gesture setting unit for recognizing the user's gesture and circumstance information, and generating circumstantial gesture information according to a combination of the recognized gesture and the circumstance information; and a gesture executing unit for executing an application item corresponding to the circumstantial gesture information.

According to another aspect of the present invention, there is provided a non-transitory computer-readable recording medium having recorded thereon a program for executing a method for operating a mobile device by recognizing a user's gesture. The method includes recognizing the user's gesture and circumstance information; generating circumstantial gesture information according to a combination of the recognized gesture and the circumstance information; and executing an application item corresponding to the circumstantial gesture information.

BRIEF DESCRIPTION OF THE DRAWINGS

The above and other objects, features and advantages of the present invention will become more apparent from the following detailed description in conjunction with the accompanying drawings, in which:

FIGS. 5A and 5B each illustrate a method of executing an application item corresponding to time-based gesture information, according to an embodiment of the present invention;

FIG. 10 is a flowchart illustrating a method of executing an application item corresponding to circumstantial gesture information by the mobile device of FIG. 7 according to an embodiment of the present invention.

DETAILED DESCRIPTION OF EMBODIMENTS OF THE INVENTION

Hereinafter, embodiments of the present invention are described in detail with reference to the accompanying drawings. The invention may, however, be embodied in many different forms and is limited to the embodiments set forth herein; rather, these embodiments are provided help convey the concept of the invention to one of ordinary skill in the art. The same reference numbers are used throughout the drawings to refer to the same or similar parts. Detailed descriptions of constructions or processes known in the art may be omitted to avoid obscuring the subject matter of the present invention.

Figure 1:
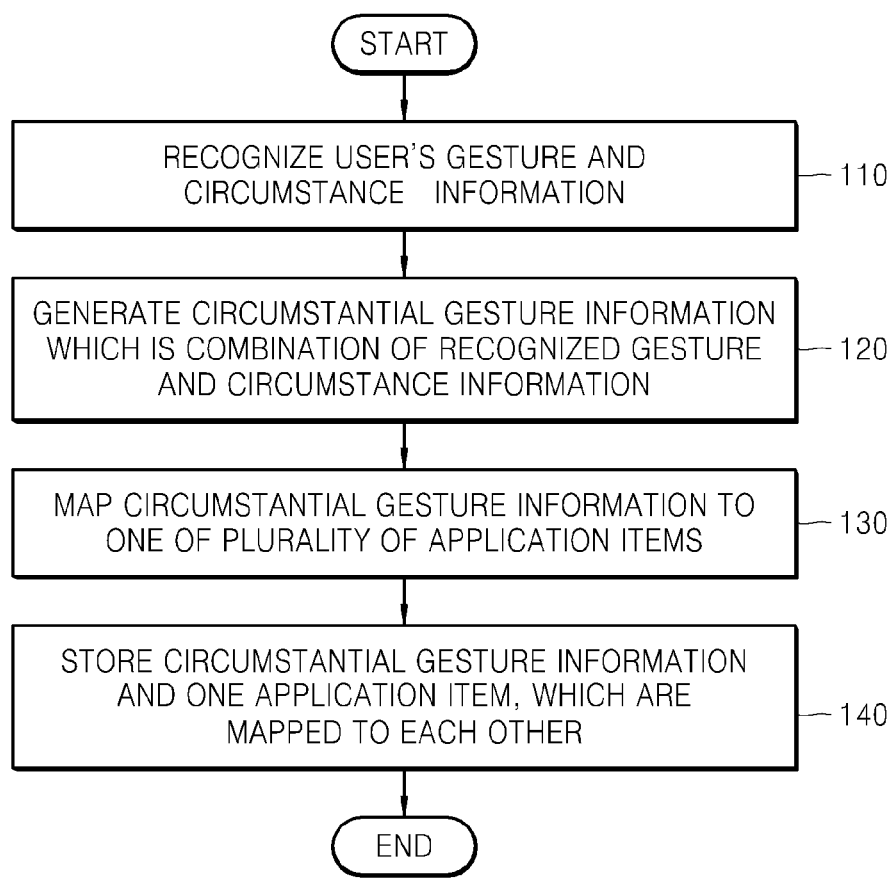
FIG. 1 is a flowchart illustrating a method of registering circumstantial gesture information and an application item corresponding thereto, according to an embodiment of the present invention.
Figure 2:
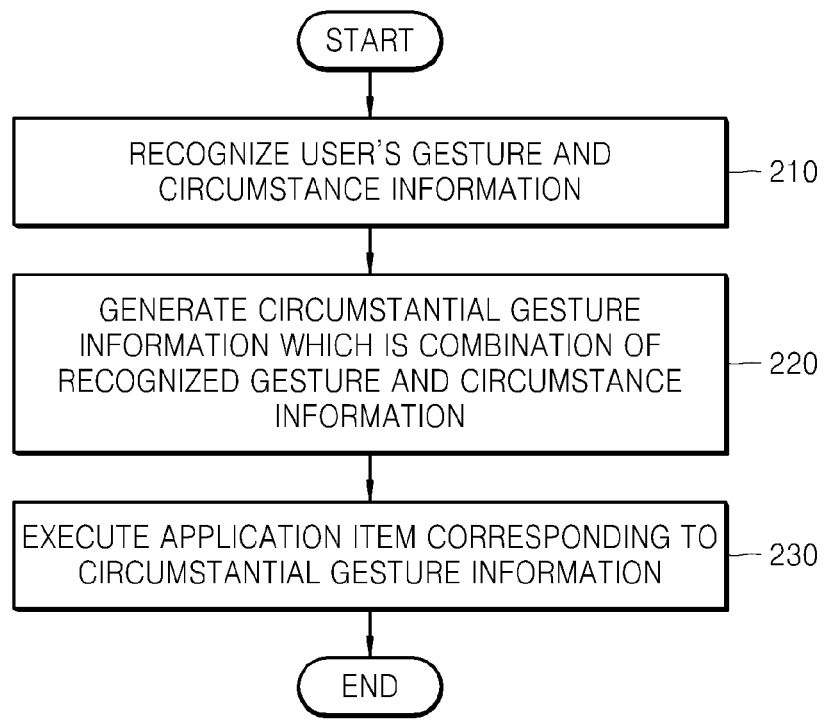
FIG. 2 is a flowchart illustrating a method of executing an application item corresponding to circumstantial gesture information, according to an embodiment of the present invention.

FIGS. 1 and 2 are flowcharts illustrating a method of operating a mobile device, according to embodiments of the present invention.

In particular, FIG. 1 is a flowchart illustrating a method of registering circumstantial gesture information and an application item corresponding thereto, according to an embodiment of the present invention. A mobile device according to embodiments of the present invention may include a mobile phone, a Personal Digital Assistant (PDA), a still camera, a video camera, a pocket calculator, a portable radio, a music or video player, a digital thermometer, a game console, a portable electronic device, a clock, or other hand-held or portable device.

Referring to FIG. 1, in step S110, the mobile device recognizes a user's gesture and circumstance information. More specifically, after the mobile device prepares to recognize the user's gesture, a user performs a gesture. The user's gesture may be made through various means, such as through a finger, motions, taps, pressure, dwells, etc. The mobile device senses the user's gesture through a sensor and determines a gesture corresponding to a sensed gesture by comparing the sensed gesture to a plurality of gestures previously stored in the mobile device. The mobile device may sense the user's gesture by extracting motion information, using, for example, an accelerometer, a gyroscope, a camera, a range finder, etc., either alone or in combination. However, embodiments of the present invention are not limited to these methods for sensing a gesture, and other such methods may be used in accordance with embodiments of the present invention.

After determining the gesture, the mobile device recognizes circumstance information. Here, the term "circumstance information" refers to information about circumstances such as a time at which the mobile device performs an application item and a location of the mobile device at the time. More specifically, the circumstances information may include information such as the current time at which a gesture is performed and a location of the mobile device at the current time, and, may further includes information such as a time set by a user and a location of the mobile device at the set time. For example, if a user wants an alarm of the mobile device to be turned off when the user makes a snap gesture at 7 A.M., the time 7 A.M. may be used as circumstance information corresponding to the snap gesture. The user may set the mobile device to recognize when 7 A.M. is the current time in connection with the snap gesture, and a turn-off of an alarm accordingly. In addition, the user may set seven A.M to the mobile device in connection with the snap gesture, and which may be used to turn-off of an alarm regardless of the current time.

The circumstance information may be obtained through various methods. For example, the mobile device may use location information obtained through a Global Positioning System (GPS) reception interface, a Wireless Fidelity (Wifi) interface, a cellular interface, etc., which may be included within the mobile device. The mobile device may also use time information that is obtained through a clock, a sensor for determining an intensity of surrounding illumination, etc., which may be included within the mobile device.

In particular, the mobile device may obtain the circumstance information, in connection with a Personal Information Management System (PIMS) or a Personal Information Manager (PIM). Here, "PIMS" and "PIM" are general terms corresponding to a software program that allows computer users to easily manage personal information. There are various kinds of PIM/PIMS software, including, but not limited to software support functions such as a text type of a simple memo, a memorial day, a name card management, appointment scheduling, a calendar, a calculator, etc. When using the PIMS/PIM for sensing the circumstance information, power consumption may be less than that of when sensing the circumstance information by using other means such as a GPS, the sensor, etc.

In step 120, the mobile device generates circumstantial gesture information by combining the recognized gesture and the circumstance information. Accordingly, a mobile device according to the present invention may perform different functions for the same gesture, depending on circumstances such as a time, a location, a feeling, etc., at a time at which the gesture is performed. For example, a combination of a single gesture and various times, and locations may be assigned to eight application items. In this case, the number eight is merely provided as an example, and other numbers of application items may be assigned to the same gesture in accordance with embodiments of the present invention.

In step 130, the circumstantial gesture information is mapped to one of a plurality of application items. Here, the plurality of application items may be commands including launching a specific program, launching a specific mode of a program, loading a web site, loading a game, performing a telephone-related operation, send a message, opening a menu, etc. The present invention is not limited to these examples, and it will be understood by those of ordinary skill in the art that other application items may be used in accordance with embodiment of the present invention. In step 130, for example, the mobile device may provide the user with an application items list including the plurality of application items previously stored in a memory. A method of providing the application items list may include various methods such as a display, a voice, a vibration, etc. The user may select one of the plurality of application items included in the application items list. The mobile device may map the circumstantial gesture information to an application item selected by the user.

In step 140, the mobile device stores the circumstantial gesture information and the application item, which are mapped to each other. In addition, the mobile device may generate a plurality of pieces of mapping information and then save the mapping information in a memory, by repeating steps 110 through 140.

FIG. 2 is a flowchart illustrating a method of executing an application item corresponding to the circumstantial gesture information, according to an embodiment of the present invention. A process of recognizing a gesture of the circumstances information and the circumstances information and generating the circumstantial gesture information is similar to the process described with reference to steps 110 and 120 of FIG. 1. Further, differences between the steps 110 and 120 and the process of FIG. 2 are explained as follows.

Referring to FIG. 2, in step 210, the mobile device recognizes a gesture of the user and the circumstance information. Here, the circumstance information may be information including at least one of the current time at which the mobile device recognizes a gesture of the user, and a location of the mobile device at the current time.

In step 220, the mobile device generates the circumstantial gesture information based upon a combination of the recognized gesture and the circumstances information. In step 230, the mobile device executes an application item corresponding to the circumstantial gesture information. The application item corresponding to the circumstantial gesture information may be an application item that is mapped to the circumstantial gesture information through operations corresponding to steps 110 through 140 of FIG. 1 and previously stored in the memory of the mobile device.

As described above, the mobile device uses the circumstance information such as a location and a time, which are information used in addition to a recognized gesture performed by the user, and executes of an application item accordingly. When the user performs a gesture, various application items may be performed depending a location and a time at which the gesture is performed, thereby allowing an application item of the mobile device to be defined more precisely according to the user's intentions. Location and time information are stored as additional information when a corresponding application item is defined. In addition, a specific application may be determined by comparing location and time information previously input by the user with the current location and time information. In result, in a method of operating the mobile device, according to an embodiment of the present invention, various application items may be performed with a single gesture in various circumstances by mapping a specific gesture to various circumstances such as a specific location or time. A concrete practical use of the mobile device according to an embodiment of the present invention is described as follows.

For example, according to an embodiment of the present invention, a mobile device may change a vibration mode of the mobile device into a sound mode, when the user performs a gesture of shaking the mobile device indoors, and may change the sound mode into the vibration mode when the user performs a gesture of shaking the mobile device outdoors.

As another example, according to an embodiment of the present invention, the mobile device may cancel an alarm previously set, if the mobile device is shook when waking up in the morning, and may set again the alarm if the mobile device is shook when going to bed in the evening.

As yet another example, a method of operating the mobile device, according to an embodiment of the present invention may also support using combined information formed by combining information used in the above two examples.

As further another example, the mobile device may recognize circumstances according to a schedule corresponding to the current time in connection with the PIMS for a gesture depending on recognition of circumstances as well as a time and a location. Then, the mobile device may perform various functions such as send a message to a friend when making a specific gesture of shaking the mobile device to try and make an appointment or a meeting with a friend or directly phoning a specific emergency services facility, such as a police station, when making a specific gesture in dangerous circumstances.

As explained above, it is possible to reduce the number of gestures the user must generate and remember by using a location and/or time related to a gesture.

Various methods of operating the mobile device of FIGS. 1 and 2, based on various circumstances (for example, a location, a time, and a feeling), in accordance with embodiments of the present invention, are described in detail as follows, with reference to FIGS. 3A through 6B.

Figure 3A:
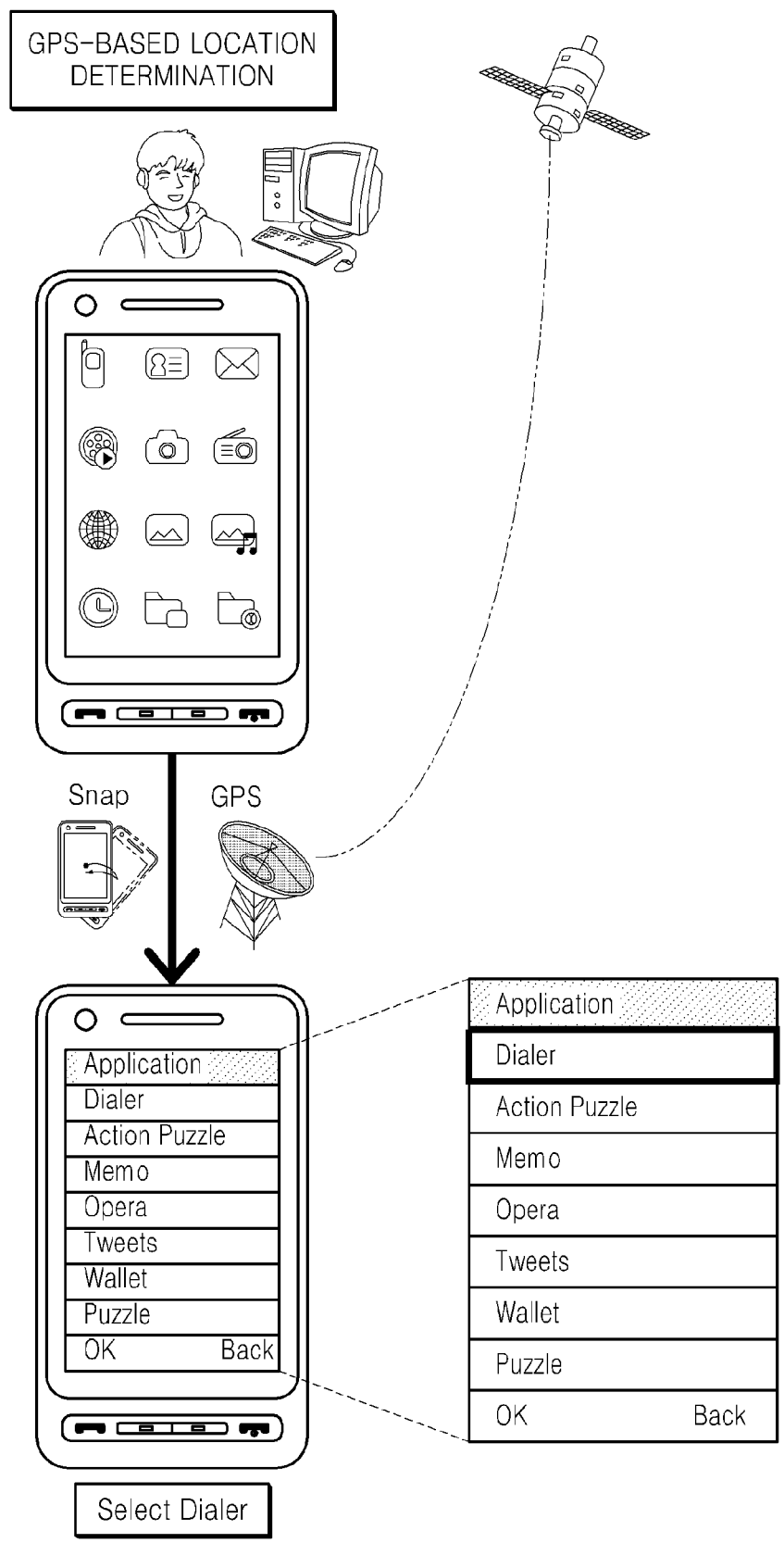
FIGS. 3A through 3C each illustrate a method of generating location-based gesture information and registering an application item, according to an embodiment of the present invention.
Figure 3B:
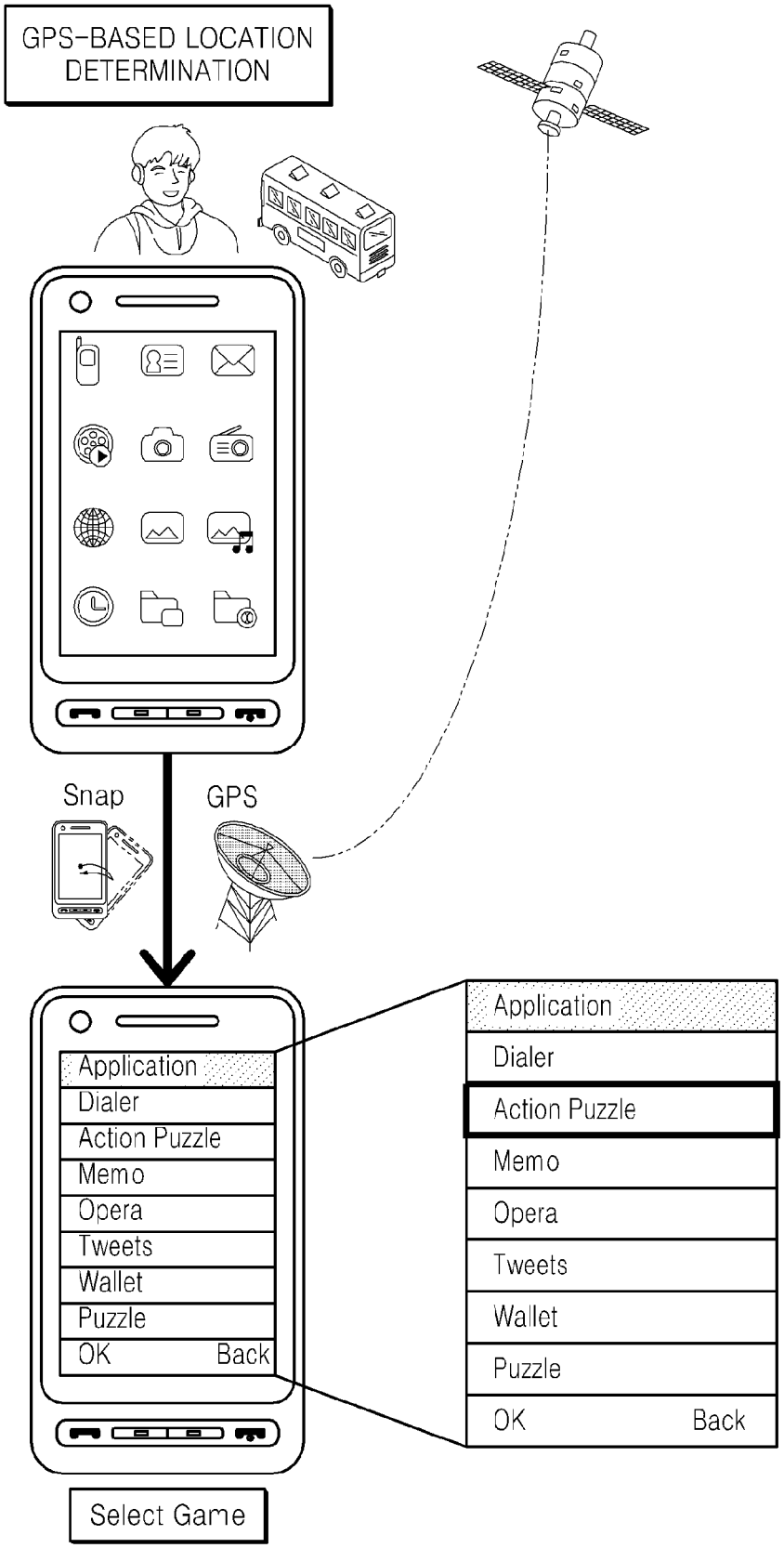
Figure 3C:
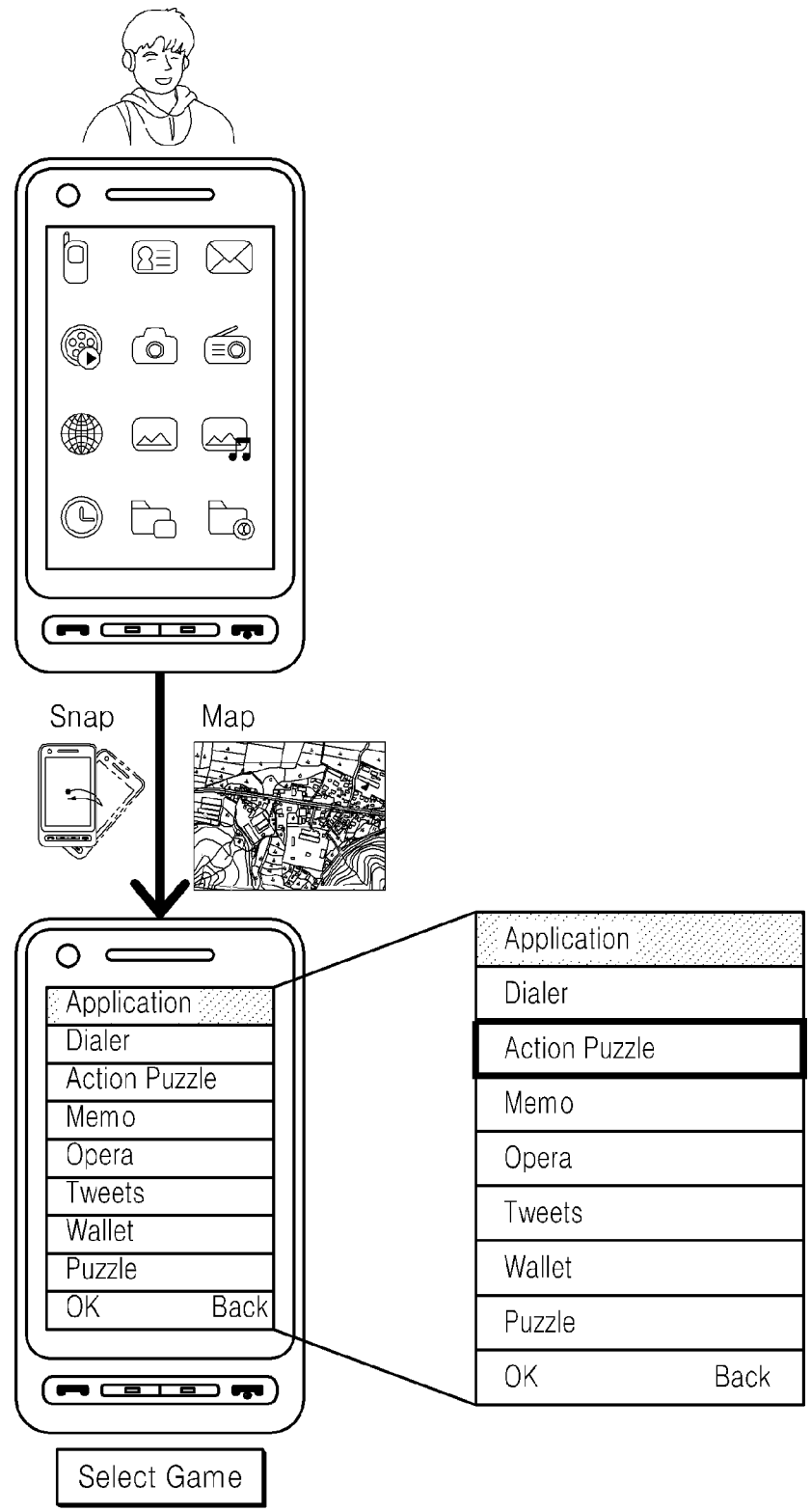

FIGS. 3A through 3C each illustrate a method of generating location-based gesture information and registering an application item, according to an embodiment of the present invention.

Referring to FIG. 3A, when a user performs a snap gesture, a mobile device recognizes the snap gesture by using raw data obtained from a sensor. The mobile device also determines that a location where a gesture is made is an office, by using GPS, Then, the mobile device maps a dialer launching action to a combination of the snap gesture and the office information, according to user input.

Then, the mobile device stores mapped combination of the snap gesture, the office information, and the dialer launching action.

By contrast, in the example according to FIG. 3B, the mobile device determines that a gesture is performed while the user is on a bus, by using GPS.

Then, the mobile device maps a game launching action to a combination of the snap gesture and the bus information according to user input, and stores mapped combination of the snap gesture, the bus information, and the game launching action.

By contrast, in the example according to FIG. 3C, the mobile device displays a map. Then, the user reads the map and then inputs a location selected by the user to the mobile device.

Then, the mobile device maps a game launching action to a combination of the snap gesture and the location information input, and stores the mapped combination of the snap gesture, the location information input by the user, and the game launching action.

Figure 4A:
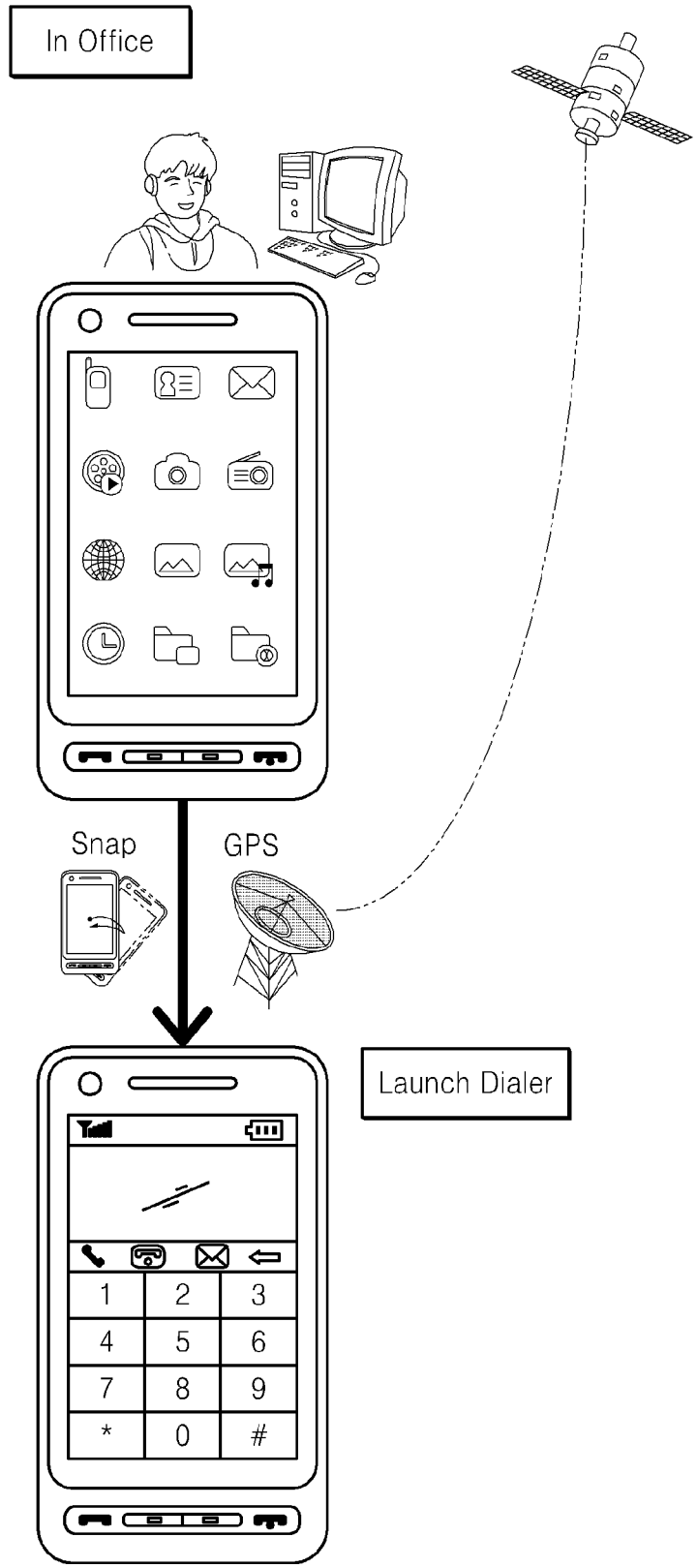
FIGS. 4A and 4B each illustrate a method of executing an application item corresponding to location-based gesture information, according to an embodiment of the present invention.
Figure 4B:
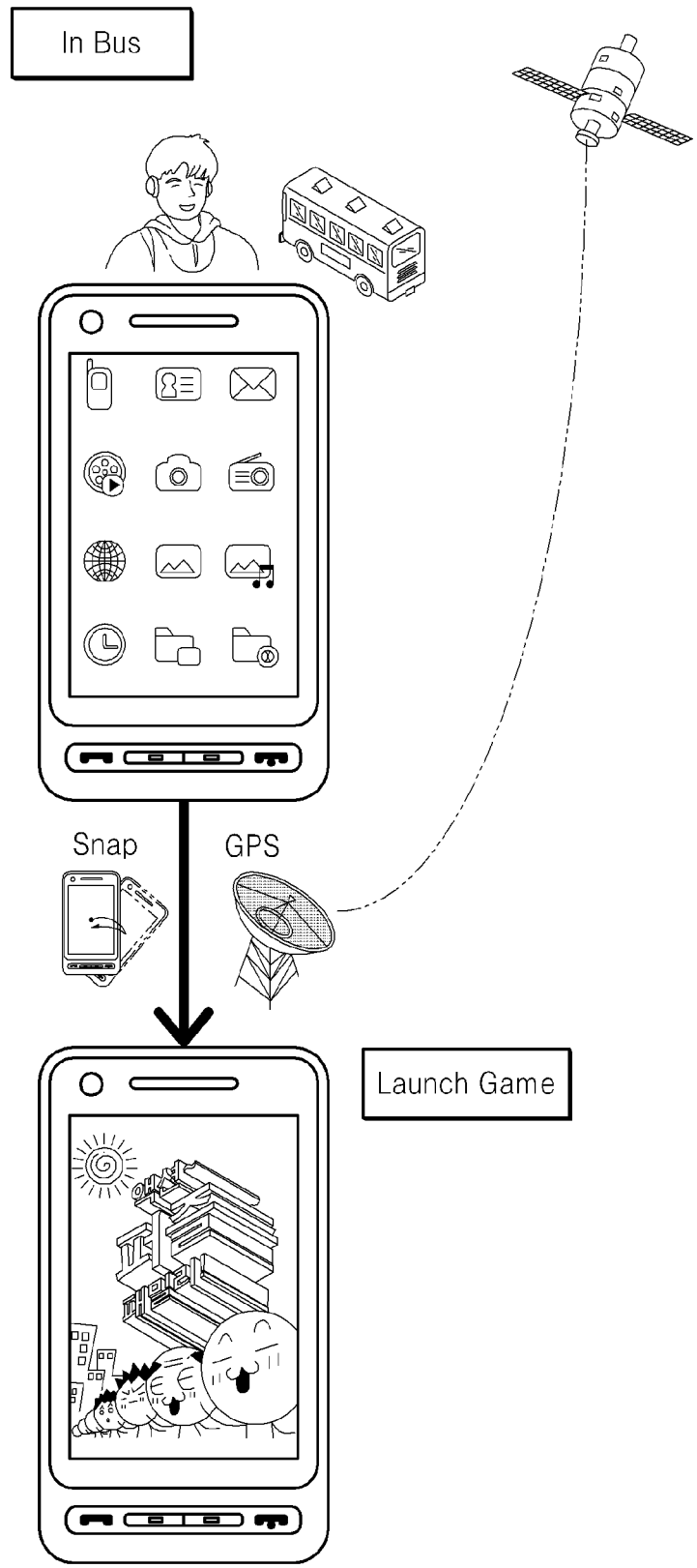

FIGS. 4A and 4B each illustrate a method of executing an application item corresponding to location-based gesture information, according to an embodiment of the present invention.

Referring to FIG. 4A, the user performs a snap gesture at a specific location, and the mobile device determines the current location by using an internal GPS module. Since the current location in this example is an office, the mobile device determines an application item mapped to a snap gesture performed in the office, which is a dialer launching action. Accordingly, the mobile device starts a dialer.

In another example according to FIG. 4B, since the snap gesture is performed while the current location is a bus, the mobile device determines an application item mapped to a snap gesture performed in the bus, which is a game launching action. Accordingly, the mobile device starts a game.

Figure 5B:
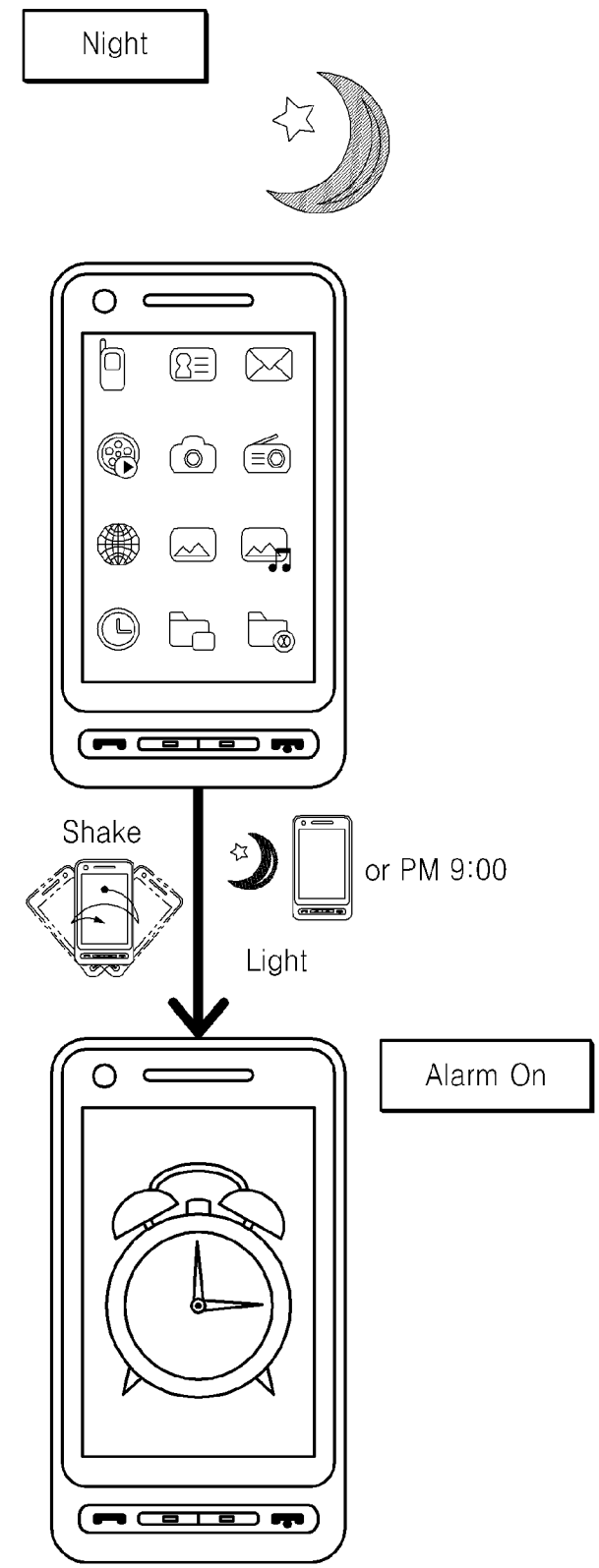

FIGS. 5A and 5B each illustrate a method of operating the mobile device based on time-based gesture information, according to an embodiment of the present invention. This method is similar to those of FIGS. 3A through 4B, and thus, differences are briefly described.

Referring to FIG. 5A, the mobile device maps a combination of a shaking gesture and 6 A.M. time information to a "turn-off" alarm action and stores the mapped combination of the shaking gesture, the 6 A.M. time information, and the turn-off alarm action. When the current time is 6 A.M. and the mobile device determines a shaking gesture is performed, the mobile device determines that the turn-off alarm action is mapped to the combination of the shaking gesture and the current time of 6 A.M., and turns off the alarm.

In another example according to FIG. 5B, the mobile device maps a shaking gesture and 9 P.M. time information to an "alarm-on" action and stores mapped combination of the shaking gesture, the 9 P.M. time information, and the alarm-on action. When a shaking gesture is performed while the current time is 9 P.M., the mobile device determines that the alarm-on action is mapped to the combination of the shaking gesture and the current time, and accordingly turns on the alarm.

Figure 6A:
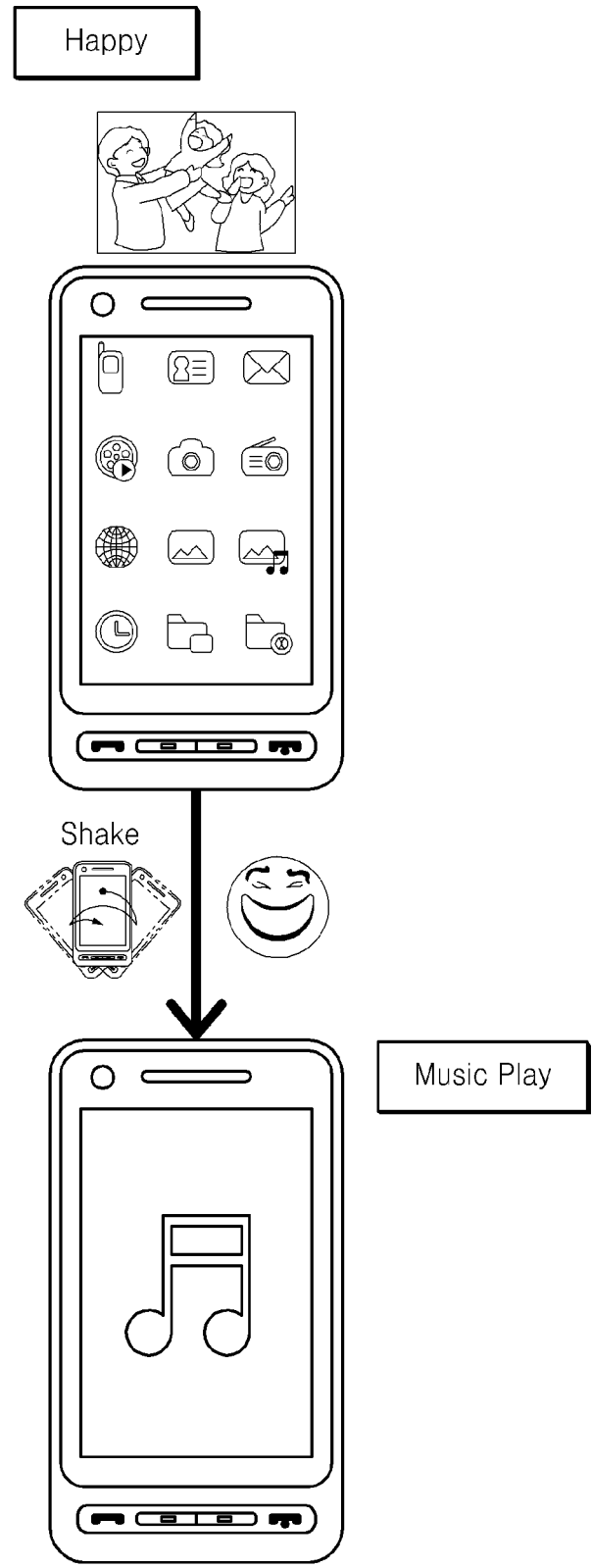
FIGS. 6A and 6B each illustrate a method of operating the mobile device based on feeling-based gesture information, according to an embodiment of the present invention.
Figure 6B:
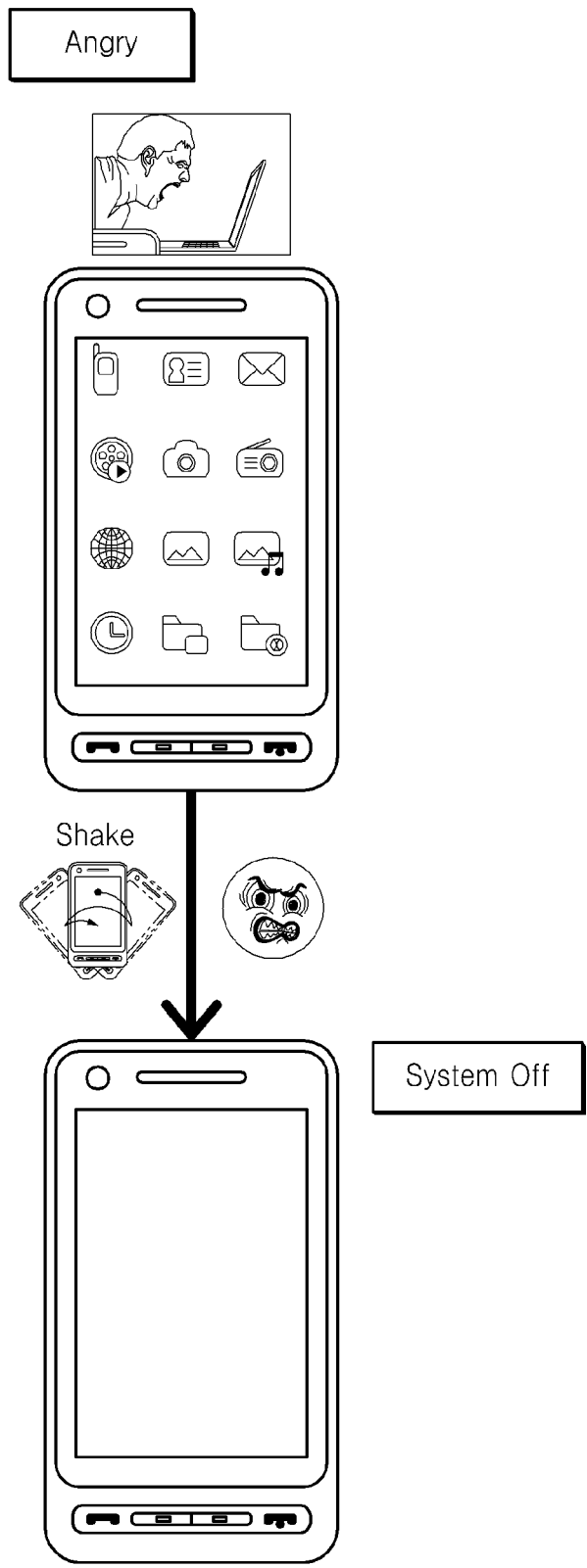

FIGS. 6A and 6B each illustrate a method of operating the mobile device based on feeling-based gesture information, according to an embodiment of the present invention.

Referring to FIG. 6A, the mobile device maps a shaking gesture and happy feeling information to a music playing action and stores the mapped combination of the shaking gesture, the happy feeling information, and the music playing action. For example, the feeling information may measure and recognize a decibel (dB) level by using a sound sensor. The feeling information may be determined to correspond to anger if the volume of a voice is greater than a specific dB value, or may be determined as happiness if the dB value is less than or equal to the specific dB value. Although a sound sensor is used for determining a user's emotional state, other sensors may be used instead of, or in combination with a sound level sensor in order to determine a variety of emotions or other user states in accordance with embodiments of the present invention.

Upon a determination that a user's current feeling is happiness while the mobile device is shaken, the mobile device confirms that the music playing action is mapped to the combination of the shaking gesture and the happiness feeling information. Accordingly, the mobile device reproduces music according to the gesture and the feeling information.

In another example according to FIG. 6B, the mobile device maps a shaking gesture and angry feeling information to a system-off action and stores mapped combination of the shaking gesture, the angry feeling information, and the system-off action. When the current feeling is determined to be anger while the mobile device is shaken, the mobile device confirms that a system-off action is mapped to the combination of the shaking gesture and anger. Accordingly, the mobile device turns itself off in response to the shaking gesture and the feeling information.

Figure 7:
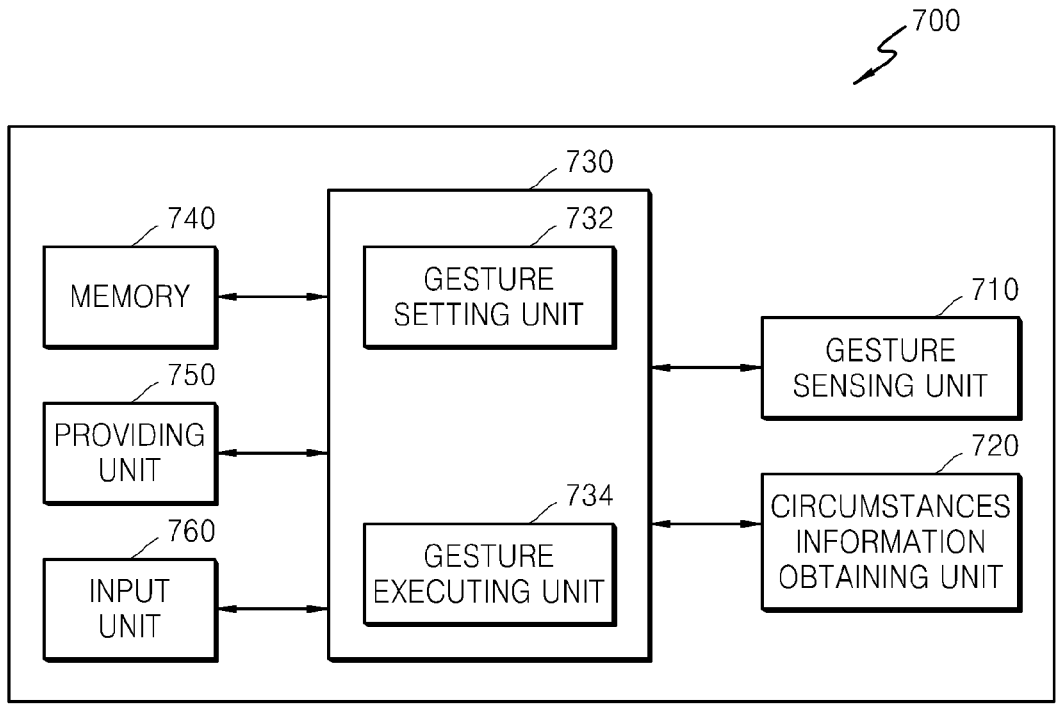
FIG. 7 is a schematic block diagram of a mobile device according to another embodiment of the present invention.

FIG. 7 is a schematic block diagram of a mobile device 700 according to an embodiment of the present invention.

Referring to FIG. 7, the mobile device 700 includes a gesture sensing unit 710, a circumstance information obtaining unit 720, a processing unit 730, a memory 740, a providing unit 750, and an input unit 760. The processing unit 730 may include a gesture setting unit 732 and/or a gesture executing unit 734.

The gesture sensing unit 710 senses a user's gesture, and may include a device for sensing movement of the mobile device 700, such as an accelerometer, a gyroscope, a camera, a terrestrial magnetism sensor, a pressure sensor, a touch screen, a range finder, or etc., or may operate in connection with one of these devices.

However, the present invention is not limited to these specific sensors, and the gesture sensing unit 710 may include other sensors for sensing the gesture in accordance with embodiments of the present invention.

The circumstances information obtaining unit 720 may obtain circumstance information such as a location, a time, and feeling information, transmit the circumstance information to the gesture setting unit 732. In addition, the circumstance information obtaining unit 720 may transmit the circumstances information of a point of time at which the gesture is performed to the gesture executing unit 734, and may obtain the circumstance information by searching for a schedule of the user, for example, in connection with the PIMS. In addition, the circumstances information obtaining unit 720 may interfaces such as a GPS receiving interface, a WiFi interface, and/or a cellular interface, and may obtain location information in connection with these interfaces.

In addition, the circumstance information obtaining unit 720 may include, for example, a clock, an illumination intensity sensor, etc., and may obtain time information in connection with any of these devices. However, the methods, which are enumerated above, of obtaining the circumstance information by the circumstance information obtaining unit 720 are merely provided as examples, and embodiments of the present invention is not limited thereto.

The memory 740 may be a magnetic medium, an optical medium, a Random Access Memory (RAM), a Read Only Memory (ROM), a mobile medium, or a kind of volatile or non-volatile memory including any other local or remote memory component. The memory 740 may include software, logic modules, or components that may be executed by the processing unit 730. The memory 740 stores gesture information of the user, the circumstances information, the application item, mapping information, etc. In addition, the memory 740 may include various applications as the PIMS. Components of the memory 740 may be combined and/or divided so as to process depending on a specific demand or desire of the user according to various embodiments of the present invention.

The processing unit 730 may be a microprocessor, a controller, or any other computing apparatus or resource. The processing unit 730 is configured so as to execute various kinds of computer commands of various computer languages to embody usable functions in the mobile device 700. In particular, the processing unit 730 may include various controllers suitable to control a management and operation of the mobile device 700.

As stated above, the processing unit 730 may include the gesture setting unit 732 and the gesture executing unit 734.

The gesture setting unit 732 recognizes the user's gesture and the circumstance information, and generates circumstantial gesture information that is a combination of the recognized gesture and the circumstances information. In addition, the gesture setting unit 732 maps the circumstantial gesture information to one of a plurality of application items, and stores the circumstantial gesture information and the one application item, which are mapped to each other, in the memory 740. Here, the gesture setting unit 732 may output an application items list including the plurality of application items to the providing unit 750 and then obtain an application item selected by the user from the application items list.

The gesture executing unit 734 recognizes the user's gesture and the circumstance information, generates the circumstantial gesture information, which is a combination of the recognized gesture and the circumstances information, and executes an application item corresponding to the circumstantial gesture information. For example, if the user performs a gesture, the gesture executing unit 734 recognizes the performed gesture based on raw data obtained by the circumstance information obtaining unit 720 at a corresponding point of time, may obtain location information and/or corresponding time information, recognizes an application item corresponding to the obtained information by performing a search in the memory 740 based on the obtained information, and then performs an application item corresponding a result of the search.

The providing unit 750 may provide an application items list including the plurality of application items, the circumstance information, and the mapping information. For example, the providing unit 750 may be a display unit, but other output devices may be used in accordance with embodiments of the present invention.

The input unit 760 provides an interface via which the user transmits input data to the mobile device. The input unit 760 may include devices such as a keyboard, a keypad, a track wheel, a knob, a touch pad, a stencil, and/or any other components with which the user may transmit input data to the mobile device.

The mobile device 700 may include some or all of the components illustrated in FIG. 7 in accordance with embodiments of the present invention. Further, the mobile device 700 may include additional components that are not illustrated in detail in FIG. 7. For example, the mobile device 700 may include a communication interface such as a WiFi interface, a cellular interface, or a GPS receiving interface. The communication interface may support wired or wireless data and information communication with other devices such as other hand-held devices or components.

Figure 8:
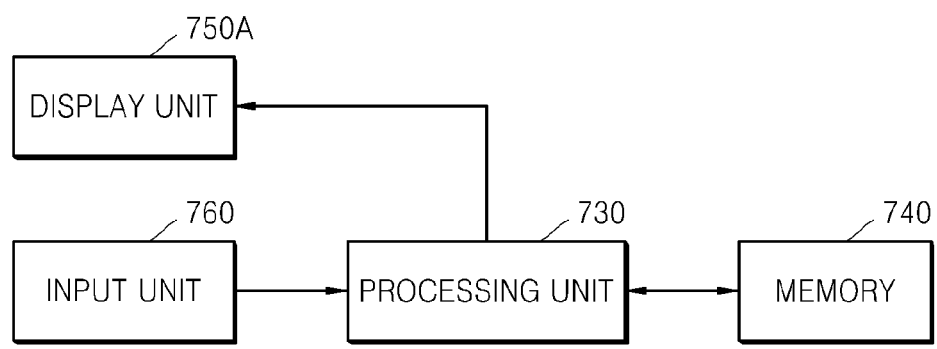
FIG. 8 is a block diagram for explaining a method of obtaining user feedback information by the mobile device of FIG. 7 according to an embodiment of the present invention.

FIG. 8 is a diagram illustrating a method of obtaining user feedback information by the mobile device of FIG. 7 according to an embodiment of the present invention.

Referring to FIG. 8, a display unit 750a may show an application items list including a plurality of application items to the user. The user selects, from the list, an application item to be mapped to specific circumstance information. The input unit 760 receives a selection of the application item selected by the user.

According to another example, the display unit 750a may display a recognized gesture and circumstance information. The user may determine whether the gesture and the circumstances information are in accord with the user's intention, by viewing the gesture and the circumstance information that are output in the display unit 750a, and then delete a combination of gesture and circumstance information that are not in accordance with a user's preferences through the input unit 760. In specific embodiments, the display unit 750a and the input unit 760 may be combined with each other to form the same component (for example, a touch screen).

Figure 9:
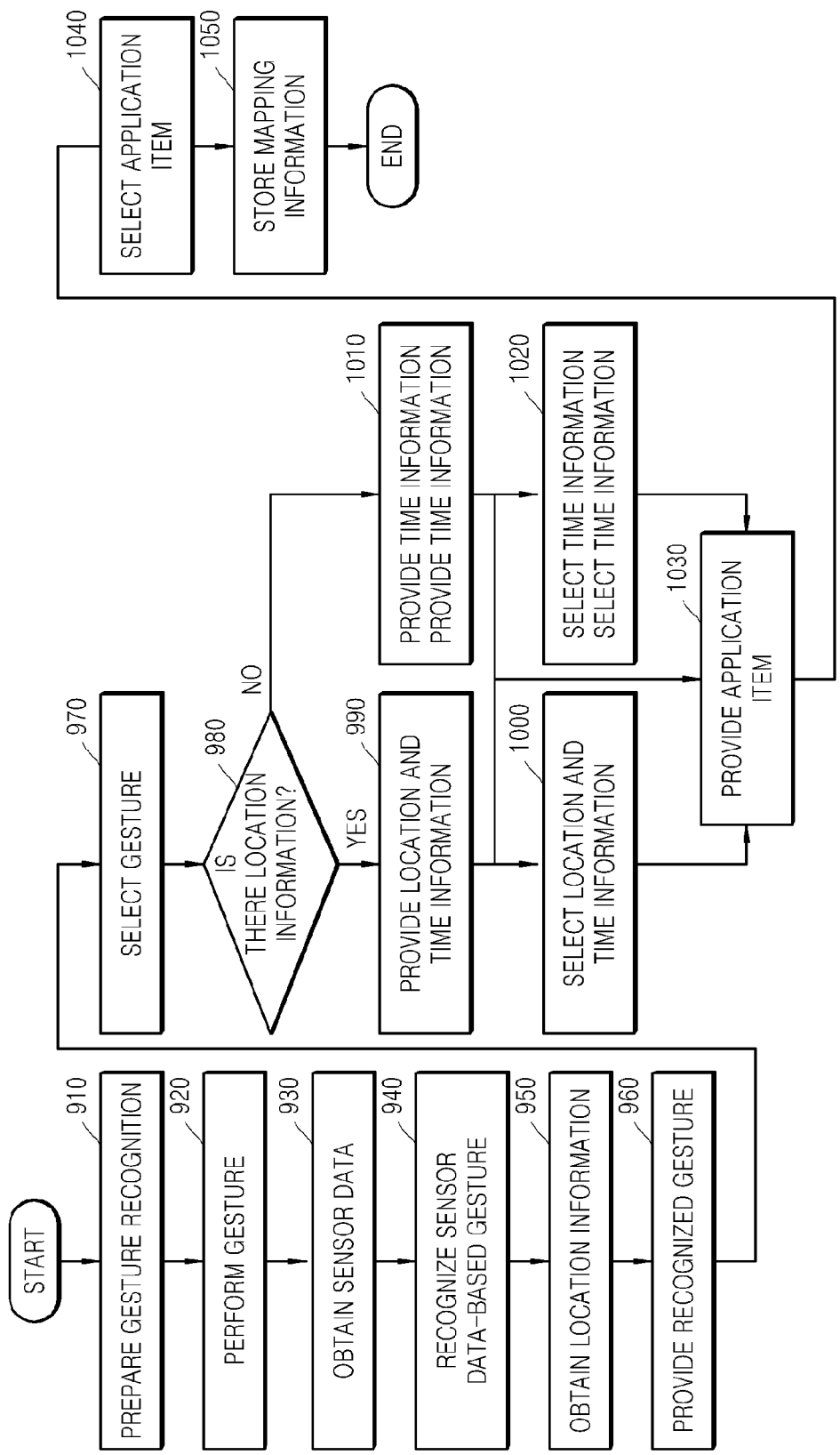
FIG. 9 is a flowchart illustrating a method of registering circumstantial gesture information and an application item corresponding to the circumstantial gesture information according to an embodiment of the present invention.

FIG. 9 is a flowchart illustrating, in detail, a method of registering circumstantial gesture information and an application item corresponding to the circumstantial gesture information by the mobile device of FIG. 7. FIG. 10 is a flowchart illustrating a method of executing an application item corresponding to circumstantial gesture information by the mobile device of FIG. 7.

The methods of FIGS. 9 and 10 may be performed by the mobile device 700 illustrated in FIG. 7, but may also be performed by the processing unit 730 with a help of peripheral components which are in the mobile device 700, in accordance with various embodiments of the present invention.

Referring to FIGS. 7 and 9, in step 910, the user places the mobile device 700 in a state for recognizing a gesture, before performing the gesture itself.

In step 920, the user performs the gesture by using the mobile device 700. In step 930, the gesture setting unit 732 obtains raw data of the gesture by using the gesture sensing unit 710, and recognizes the raw data as a gesture, in step 940. In step 950, the gesture setting unit 732 obtains location information of when the gesture has been performed, from the circumstance information obtaining unit 720, and provides information for a recognized result, by outputting gesture information recognized by the user, in step 960.

In step 970, the user selects a gesture that was intended by the user through the input unit 760. In step 980, the gesture setting unit 732 confirms whether location information recognized when the user performs the gesture. In step 990, if the location information is recognized, the gesture setting unit 732 outputs the location information to the providing unit 750. If the user does not select the location information and time information, an application items list is directly output to the providing unit 750.

In step 1000, the user selects the location information, the time information, or both, through the input unit 760. In step 1010, if there is no location information, only the time information is output to the providing unit 750. If the user does not select the time information, the application items list is directly output to the providing unit 750.

In step 1020, the user selects the time information through the input unit 760. In step 1030, the gesture setting unit 732 outputs an application items list assigned to the gesture to the providing unit 750. In step 1040, the user selects a desired application item from the application items list through the input unit 760. In step 1050, the gesture setting unit 732 stores circumstantial gesture information, which is a combination of the gesture and the circumstance information (e.g., a location and/or time), and an application item corresponding to the circumstantial gesture information.

FIG. 10 is a flowchart illustrating a method of executing an application item corresponding to circumstantial gesture information by the mobile device of FIG. 7.

Referring to FIGS. 7 and 10, in step 1100, the user sets the mobile device 700 into a state for recognizing a gesture before performing the gesture itself in step 1200.

In step 1300, the gesture executing unit 734 obtains raw data of the gesture by using the circumstance information obtaining unit 720, recognizes the gesture by using the obtained raw data, in step 1400, obtains location and time information of the mobile device of a point of time when the gesture is performed, from the circumstance information obtaining unit 720 in step 1500, and confirms whether the location and time information has been obtained in step 1600.

If the location and time information has been obtained, the gesture executing unit 734 checks whether a recognized gesture and circumstantial gesture information corresponding to the location and time information are present. In step 1800, the gesture executing unit 734 checks whether there is a gesture corresponding to the recognized gesture, if no information has been obtained in step 1600.

In step 1900, the gesture executing unit 734 checks whether there is an application item related to found circumstantial gesture information. In addition, the gesture executing unit 734 checks whether there is an application item related to a found gesture. If there is no application item related to the found gesture, the current state is again changed to a gesture performance standby state to receive input of another gesture. In step 2000, the gesture executing unit 734 performs an application item assigned to the gesture.

Methods of operating a mobile device by recognizing a user's gestures, according to embodiments of the present invention, can also be embodied as computer-readable codes on a non-transitory computer-readable recording medium. The computer-readable recording medium includes any data storage device that can store data that can be thereafter read by a computer system. Examples of such computer-readable recording mediums include Read-Only Memory (ROM), Random-Access Memory (RAM), Compact Disc (CD)-ROMs, magnetic tapes, floppy disks, optical data storage devices, etc. The computer-readable recording medium can also be distributed over network-coupled computer systems so that the computer-readable code is stored and executed in a distributed fashion. Also, functional programs, codes, and code segments for accomplishing the method according to the present invention can be easily construed by programmers skilled in the art to which the present invention pertains.

While this invention is particularly shown and described with reference to certain embodiments thereof, it will be understood by those skilled in the art that various changes in form and details may be made therein without departing from the spirit and scope of the invention as defined by the appended claims. The embodiments should be considered in descriptive sense only and not for purposes of limitation. Therefore, the scope of the invention is defined not by the detailed description of the invention but by the appended claims, and all such differences within the scope of the claims are to be construed as being included in the present invention.

What is claimed is:

1. A method of operating a mobile device by recognizing a user's gesture, the method comprising:
   recognizing the user's gesture and circumstance information;
   outputting to a user, information indicating the recognized gesture and the circumstance information;
   generating circumstantial gesture information according to a combination of the recognized gesture and the circumstance information; and
   executing an application item corresponding to the circumstantial gesture information,
   wherein the circumstance information includes a time at which the user's gesture is recognized and a location of the mobile device at the time, and is obtained in connection with a Personal Information Management System (PIMS), and
   wherein recognizing the user's gesture and the circumstance information includes sensing the user's gesture and determining a gesture corresponding to the recognized gesture by comparing a sensed gesture to a plurality of gestures that are previously stored.

2. The method of claim 1, wherein time information about the time is obtained through at least one of an illumination intensity sensor and a clock, which is included in the mobile device.

3. The method of claim 1, wherein location information about the location is obtained through at least one of a Global Positioning System (GPS) reception interface, a Wireless Fidelity (WiFi) interface, and a cellular interface, which is included in the mobile device.

4. The method of claim 1, wherein the application item varies according to a combination of the recognized gesture and the circumstance information.

5. The method of claim 1, wherein the mobile device senses the user's gesture by using at least one of an accelerometer, a gyroscope, a camera, a range finder, a terrestrial magnetism sensor, a pressure sensor, and a touch screen.

6. The method of claim 1, further comprising:
   outputting, to a user, information indicating the recognized gesture and the circumstance information; and
   receiving user feedback information indicating whether the recognized gesture and the circumstance information was intended by the user.

7. A method of operating a mobile device by recognizing a user's gesture, the method comprising:
   recognizing the user's gesture and circumstance information;
   outputting to a user, information indicating the recognized gesture and the circumstance information;
   generating circumstantial gesture information according to a combination of the recognized gesture and the circumstance information;
   mapping the circumstantial gesture information to one of a plurality of application items; and
   storing the mapping of the circumstantial gesture information to the one application item,
   wherein the circumstance information includes a time at which the user's gesture is recognized and a location of the mobile device at the time, and is obtained in connection with a Personal Information Management System (PIMS), and
   wherein recognizing the user's gesture and the circumstance information includes sensing the user's gesture and determining a gesture corresponding to the recognized gesture by comparing a sensed gesture to a plurality of gestures that are previously stored.

8. The method of claim 7, wherein mapping the circumstantial gesture information to one of the plurality of application items comprises:
   outputting, to a user, an application items list including the plurality of application items;
   receiving a selection of an application item in the application items list based on a user input signal; and
   mapping the circumstantial gesture information to the selected application item.

9. A mobile device operating by recognizing a user's gesture, the mobile device comprising:
   a gesture setting unit for recognizing the user's gesture and circumstance information, and generating circumstantial gesture information according to a combination of the recognized gesture and the circumstance information; and
   a gesture executing unit for executing an application item corresponding to the circumstantial gesture information,
   wherein the circumstance information includes a time at which the user's gesture is recognized and a location of the mobile device at the time, and is obtained in connection with a Personal Information Management System (PIMS), and
   wherein recognizing the user's gesture and the circumstance information includes sensing the user's gesture and determining a gesture corresponding to the recognized gesture by comparing a sensed gesture to a plurality of gestures that are previously stored.

10. The mobile device of claim 9, wherein the application item varies according to a combination of the recognized gesture and the circumstance information.

11. The mobile device of claim 9, further comprising:
    a providing unit for outputting, to a user, information indicating the recognized gesture and the circumstance information; and
    an input unit for receiving user feedback information indicating whether the recognized gesture and the circumstance information was intended by the user.

12. The mobile device of claim 11, wherein the providing unit includes a display unit.

13. The mobile device of claim 9, further comprising a circumstance information obtaining unit for obtaining the circumstance information in connection with a user's emotional state.

14. The mobile device of claim 13, where the user's emotional state is determined according to a decibel level of sound information received through a microphone.

15. The mobile device of claim 9, wherein the gesture setting unit maps the circumstantial gesture information to one of a plurality of application items, and stores the mapping of the circumstantial gesture information to the one application item to a memory, and
    wherein the gesture executing unit executes the mapped application item.

16. A non-transitory computer-readable recording medium having recorded thereon a program for executing a method of operating a mobile device by recognizing a user's gesture, the method comprising:

recognizing the user's gesture and circumstance information;

outputting to a user, information indicating the recognized gesture and the circumstance information;

generating circumstantial gesture information according to a combination of the recognized gesture and the circumstance information; and executing an application item corresponding to the circumstantial gesture information, wherein the circumstance information includes a time at which the user's gesture is recognized and a location of the mobile device at the time, and is obtained in connection with a Personal Information Management System (PIMS), and wherein recognizing the user's gesture and the circumstance information includes sensing the user's gesture and determining a gesture corresponding to the recognized gesture by comparing a sensed gesture to a plurality of gestures that are previously stored.

* * * * *